(12) United States Patent
Jovanovski et al.

(10) Patent No.: US 8,537,245 B2
(45) Date of Patent: Sep. 17, 2013

(54) IMAGING AND DECODING DEVICE WITH QUANTUM DOT IMAGER

(75) Inventors: Brian L. Jovanovski, Syracuse, NY (US); Daniel Van Volkinburg, Syracuse, NY (US); Alexey Chernyakov, Ithaca, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/040,737

(22) Filed: Mar. 4, 2011

(65) Prior Publication Data
US 2012/0224083 A1    Sep. 6, 2012

(51) Int. Cl.
*H04N 5/76* (2006.01)
*G11C 11/00* (2006.01)

(52) U.S. Cl.
USPC ...................... 348/231.99; 365/129

(58) Field of Classification Search
None
See application file for complete search history.

(56) References Cited

U.S. PATENT DOCUMENTS

| | | |
|---|---|---|
| 5,019,699 A | 5/1991 | Koenck |
| 5,406,062 A | 4/1995 | Hasegawa et al. |
| 5,504,367 A | 4/1996 | Arackellian et al. |
| 5,541,419 A | 7/1996 | Aracellian |
| 5,572,006 A | 11/1996 | Wang et al. |
| 5,576,529 A | 11/1996 | Koenck et al. |
| 5,591,955 A | 1/1997 | Laser |
| 5,646,390 A | 7/1997 | Wang et al. |
| 5,648,650 A | 7/1997 | Sugifune et al. |
| 5,701,001 A | 12/1997 | Sugifune et al. |
| 5,756,981 A | 5/1998 | Roustaei et al. |
| 5,784,102 A | 7/1998 | Hussey et al. |
| 5,815,200 A | 9/1998 | Ju et al. |
| 5,877,487 A | 3/1999 | Tani et al. |
| 5,886,338 A | 3/1999 | Arackellian et al. |
| 6,010,070 A | 1/2000 | Mizuochi et al. |
| 6,230,975 B1 | 5/2001 | Colley et al. |
| 6,254,003 B1 | 7/2001 | Pettinelli et al. |

(Continued)

OTHER PUBLICATIONS

InVisage Solves "Rolling Shutter" Phenomenon, Besting Image Sensor Market Leaders, Menlo Park, CA, Sep. 24, 2010, http://www.reuters.com/article/2010/09/24/idUS163563+24-Sep-2010.

(Continued)

*Primary Examiner* — Luong T Nguyen
(74) *Attorney, Agent, or Firm* — Heslin Rothenberg Farley & Mesiti P.C.

(57) ABSTRACT

Devices, systems, and methods are disclosed for imaging with a decoding imager based on semiconducting nanocrystals that function as quantum dots, and decoding decodable features in the images. In an illustrative embodiment, a device includes an imaging subsystem, a data storage element, and a processor. The imaging subsystem includes an image sensor array and an imaging optics assembly operative for focusing an image onto the image sensor array. The image sensor array includes a plurality of pixels wherein a pixel includes a photosensitive portion comprising one or more nanocrystals, and a read-out portion capable of relaying incident light data representing light incident on the one or more nanocrystals. The data storage element is capable of storing frames of image data comprising data communicated through the read-out portion of at least some of the pixels during the imaging operation. The processor is operative for receiving one or more of the frames of image data from the data storage element and performing a decode operation for performing an attempted decode of a decodable feature represented in at least one of the frames of image data.

27 Claims, 3 Drawing Sheets

(56) References Cited

U.S. PATENT DOCUMENTS

| | | | |
|---|---|---|---|
| 6,283,374 B1 | 9/2001 | Fantone et al. | |
| 6,347,163 B2 | 2/2002 | Roustaei | |
| 6,412,700 B1 | 7/2002 | Blake et al. | |
| 6,669,093 B1 | 12/2003 | Meyerson et al. | |
| 6,695,209 B1 | 2/2004 | La | |
| 6,722,569 B2 * | 4/2004 | Ehrhart et al. | 235/469 |
| 6,749,120 B2 | 6/2004 | Hung et al. | |
| 6,832,725 B2 | 12/2004 | Gardiner et al. | |
| 6,877,661 B2 | 4/2005 | Webb et al. | |
| 6,888,666 B1 | 5/2005 | Sargent | |
| 6,890,764 B2 | 5/2005 | Chee et al. | |
| 7,061,395 B1 | 6/2006 | Bromer | |
| 7,077,321 B2 | 7/2006 | Longacre, Jr. et al. | |
| 7,083,097 B2 | 8/2006 | Toyama et al. | |
| 7,083,098 B2 | 8/2006 | Joseph et al. | |
| 7,185,817 B2 | 3/2007 | Zhu et al. | |
| 7,219,843 B2 | 5/2007 | Havens et al. | |
| 7,234,641 B2 | 6/2007 | Olmstead | |
| 7,240,844 B2 | 7/2007 | Zhu et al. | |
| 7,255,279 B2 | 8/2007 | Zhu et al. | |
| 7,270,274 B2 | 9/2007 | Hennick et al. | |
| 7,303,126 B2 | 12/2007 | Patel et al. | |
| 7,308,375 B2 | 12/2007 | Jensen et al. | |
| 7,320,431 B2 | 1/2008 | Zhu et al. | |
| 7,326,908 B2 | 2/2008 | Sargent et al. | |
| 7,336,197 B2 | 2/2008 | Ding et al. | |
| 7,357,326 B2 | 4/2008 | Hattersley et al. | |
| 7,387,250 B2 | 6/2008 | Mani | |
| 7,398,927 B2 | 7/2008 | Olmstead et al. | |
| 7,490,778 B2 | 2/2009 | Zhu et al. | |
| 7,503,499 B2 | 3/2009 | Zhu et al. | |
| 7,513,430 B2 | 4/2009 | Zhu et al. | |
| 7,516,899 B2 | 4/2009 | Laser | |
| 7,527,207 B2 | 5/2009 | Acosta et al. | |
| 7,533,824 B2 | 5/2009 | Hennick et al. | |
| 7,568,628 B2 | 8/2009 | Wang et al. | |
| 7,611,060 B2 | 11/2009 | Wang et al. | |
| 7,656,556 B2 | 2/2010 | Wang | |
| 7,693,744 B2 | 4/2010 | Forbes | |
| 7,735,737 B2 | 6/2010 | Kotlarsky et al. | |
| 7,742,322 B2 | 6/2010 | Sargent et al. | |
| 7,746,681 B2 | 6/2010 | Sargent et al. | |
| 7,762,464 B2 | 7/2010 | Goren et al. | |
| 7,770,799 B2 | 8/2010 | Wang | |
| 7,773,404 B2 * | 8/2010 | Sargent et al. | 365/129 |
| 7,775,436 B2 | 8/2010 | Knowles et al. | |
| 7,780,089 B2 | 8/2010 | Wang | |
| 7,785,657 B2 * | 8/2010 | LoCascio et al. | 427/74 |
| 7,809,407 B2 | 10/2010 | Oshima et al. | |
| 7,810,720 B2 | 10/2010 | Lovett | |
| 7,813,047 B2 | 10/2010 | Wang et al. | |
| 7,881,091 B2 | 2/2011 | Sargent et al. | |
| 7,909,257 B2 | 3/2011 | Wang et al. | |
| 7,918,398 B2 | 4/2011 | Li et al. | |
| 7,923,801 B2 | 4/2011 | Tian et al. | |
| 7,995,178 B2 | 8/2011 | Suguro et al. | |
| 8,004,057 B2 | 8/2011 | Tian et al. | |
| 8,013,412 B2 | 9/2011 | Tian | |
| 8,023,306 B2 | 9/2011 | Sargent et al. | |
| 8,054,671 B2 | 11/2011 | Sargent et al. | |
| 8,074,887 B2 | 12/2011 | Havens et al. | |
| 8,115,232 B2 | 2/2012 | Sargent et al. | |
| 8,138,567 B2 | 3/2012 | Ivanov et al. | |
| 8,203,195 B2 | 6/2012 | Ivanov et al. | |
| 8,269,302 B2 | 9/2012 | Tian et al. | |
| 8,274,126 B2 | 9/2012 | Tian et al. | |
| 8,284,586 B2 | 10/2012 | Sargent et al. | |
| 8,284,587 B2 | 10/2012 | Sargent et al. | |
| 2003/0062413 A1 | 4/2003 | Gardiner et al. | |
| 2003/0222147 A1 | 12/2003 | Havens et al. | |
| 2004/0020990 A1 | 2/2004 | Havens et al. | |
| 2004/0164165 A1 | 8/2004 | Havens et al. | |
| 2005/0001035 A1 | 1/2005 | Hawley et al. | |
| 2005/0023356 A1 | 2/2005 | Wiklof et al. | |
| 2005/0103854 A1 | 5/2005 | Zhu et al. | |
| 2005/0167504 A1 * | 8/2005 | Meier et al. | 235/462.45 |
| 2005/0178842 A1 * | 8/2005 | Hepworth et al. | 235/472.01 |
| 2005/0205879 A1 | 9/2005 | Fukunaga | |
| 2005/0279836 A1 | 12/2005 | Havens et al. | |
| 2006/0011724 A1 | 1/2006 | Joseph et al. | |
| 2006/0043194 A1 | 3/2006 | Barkan et al. | |
| 2006/0113386 A1 | 6/2006 | Olmstead | |
| 2006/0163355 A1 | 7/2006 | Olmstead et al. | |
| 2006/0202036 A1 | 9/2006 | Wang et al. | |
| 2006/0202038 A1 | 9/2006 | Wang et al. | |
| 2006/0243959 A1 | 11/2006 | Sargent et al. | |
| 2006/0274171 A1 | 12/2006 | Wang | |
| 2006/0283952 A1 | 12/2006 | Wang | |
| 2007/0138293 A1 | 6/2007 | Zhu et al. | |
| 2007/0181692 A1 | 8/2007 | Barkan et al. | |
| 2007/0284447 A1 | 12/2007 | McQueen | |
| 2008/0023556 A1 | 1/2008 | Vinogradov et al. | |
| 2008/0223933 A1 | 9/2008 | Smith | |
| 2009/0026267 A1 | 1/2009 | Wang et al. | |
| 2009/0057413 A1 | 3/2009 | Vinogradov et al. | |
| 2009/0072038 A1 | 3/2009 | Li et al. | |
| 2009/0140050 A1 | 6/2009 | Liu et al. | |
| 2009/0152664 A1 | 6/2009 | Klem et al. | |
| 2010/0019334 A1 | 1/2010 | Ivanov et al. | |
| 2010/0019335 A1 | 1/2010 | Ivanov et al. | |
| 2010/0044436 A1 | 2/2010 | Powell et al. | |
| 2010/0044440 A1 | 2/2010 | Wang et al. | |
| 2010/0044676 A1 | 2/2010 | Sargent et al. | |
| 2010/0078477 A1 | 4/2010 | Wang et al. | |
| 2010/0108769 A1 | 5/2010 | Wang et al. | |
| 2010/0133418 A1 | 6/2010 | Sargent et al. | |
| 2010/0147956 A1 | 6/2010 | Wang et al. | |
| 2010/0187404 A1 | 7/2010 | Klem et al. | |
| 2010/0187408 A1 * | 7/2010 | Klem et al. | 250/214.1 |
| 2010/0314529 A1 | 12/2010 | Sargent et al. | |
| 2011/0101205 A1 | 5/2011 | Tian et al. | |
| 2011/0163165 A1 | 7/2011 | Liu et al. | |
| 2011/0174880 A1 | 7/2011 | Li et al. | |
| 2011/0303897 A1 | 12/2011 | Tian et al. | |
| 2011/0303898 A1 | 12/2011 | Tian et al. | |
| 2011/0309236 A1 | 12/2011 | Tian et al. | |
| 2011/0309238 A1 | 12/2011 | Tian et al. | |
| 2012/0000982 A1 | 1/2012 | Gao et al. | |
| 2012/0037789 A1 | 2/2012 | Tian et al. | |
| 2012/0037887 A1 | 2/2012 | Tian et al. | |
| 2012/0043455 A1 | 2/2012 | Tian et al. | |
| 2012/0049311 A1 | 3/2012 | Tian et al. | |
| 2012/0056074 A1 | 3/2012 | Tian et al. | |
| 2012/0056075 A1 | 3/2012 | Tian et al. | |
| 2012/0056160 A1 | 3/2012 | Tian et al. | |
| 2012/0056289 A1 | 3/2012 | Tian et al. | |
| 2012/0100699 A1 | 4/2012 | Sargent et al. | |
| 2012/0111944 A1 | 5/2012 | Gao et al. | |
| 2012/0126354 A1 * | 5/2012 | Jaworski et al. | 257/432 |
| 2012/0138684 A1 | 6/2012 | Van Volkinsburg et al. | |
| 2012/0153022 A1 | 6/2012 | Havens et al. | |
| 2012/0193429 A1 | 8/2012 | Van Volkinsburg et al. | |
| 2012/0208315 A1 | 8/2012 | Sargent et al. | |

OTHER PUBLICATIONS

Aug. 28, 2012 Communication pursuant to Article 94(3) EPC in European Application No. 12157603.7.

Jun. 29, 2012 European Search Report in European Application No. 12157603.7.

Mar. 27, 2013 Office Action in European Application No. 12157603.7.

US 8,022,391, 09/2011, Sargent et al. (withdrawn)

* cited by examiner

IMAGING AND DECODING DEVICE WITH QUANTUM DOT IMAGER

FIELD OF THE INVENTION

The present invention relates in general to devices for imaging and decoding decodable features in the images.

BACKGROUND

Indicia reading terminals and decoding imagers for reading and decoding decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications. Some indicia reading terminals are adapted to read bar code symbols including one or more of one dimensional (1D) bar codes, stacked 1D bar codes, and two dimensional (2D) bar codes. Other indicia reading terminals are adapted to use optical character recognition (OCR) to read standard characters while still other indicia reading terminals are equipped to read both bar code symbols and OCR characters. Digital devices with imaging subsystems, such as smartphones, tablet computers, and other formats of mobile computers, may also be used for capturing and performing attempted decodes on image frames having one or more decodable features, such as characters, words, sentences, one dimensional (1D) barcodes, stacked 1D barcodes, and two dimensional (2D) barcodes, in any of a variety of formats, for example.

Some indicia reading terminals and decoding imagers employ charge-coupled device (CCD) based image sensors. A CCD based image sensor contains an array of electrically coupled light sensitive photodiodes that convert incident light energy into packets of electric charge. In operation, the charge packets are shifted out of the CCD imager sensor for subsequent processing.

Some indicia reading terminals and decoding imagers employ complementary metal-oxide semiconductor (CMOS) based image sensors as an alternative imaging technology. As with CCDs, CMOS based image sensors contain arrays of light sensitive photodiodes that convert incident light energy into electric charge. Unlike CCDs, however, CMOS based image sensors allow each pixel in a two-dimensional array to be directly addressed. One advantage of this is that sub-regions of a full frame of image data can be independently accessed, for a cropped or windowed frame of image data. Another advantage of CMOS based image sensors is that in general they have lower costs per pixel. This is primarily due to the fact that CMOS image sensors are made with standard CMOS processes in high volume wafer fabrication facilities that produce common integrated circuits such as microprocessors and the like. In addition to lower cost, the common fabrication process means that a CMOS pixel array can be integrated on a single circuit with other standard electronic devices such as clock drivers, digital logic, analog/digital converters and the like. This in turn has the further advantage of reducing space requirements and lowering power usage.

CMOS based image readers have traditionally employed rolling shutters to expose pixels in the sensor array. In a rolling shutter architecture, rows of pixels are activated and read-out in sequence. The exposure or integration time for a pixel is the time between a pixel being reset and its value being read-out. The exposure periods for adjacent rows of pixels typically overlap substantially as, in a typical example, several hundred rows of pixels must be exposed and read during the capture of a frame of data. The rolling shutter architecture with its overlapping exposure periods requires that the illumination source remain on during substantially all of the time required to capture a frame of data so that illumination is provided for all of the rows. In operation, the rolling shutter architecture also suffers from at least two imaging disadvantages: image distortion and image blur. Image distortion is an artifact of the different times at which each row of pixels is exposed. The effect of image distortion is most pronounced when fast moving objects are visually recorded, where different parts of the object are imaged while the object is at different positions, so that the object is distorted in the image. Image blur is an artifact of the long exposure periods typically required in a rolling shutter architecture in an image reader. As indicated above, in a rolling shutter architecture the illumination source must remain on during substantially all of the time required to capture a frame of data. Due to battery and/or illumination source limitations, the light provided during the capture of an entire frame of data is usually not adequate for short exposure times. Without a short exposure time, blur inducing effects become pronounced. Common examples of blur inducing effects include the displacement of an image sensor due to, for example, the unsteadiness of a user's hand with a hand held image reader.

As the pixel density of imagers used in barcode scanners and other imaging devices increases, a major trade-off against resolution is the loss in sensitivity due to a reduced pixel size. Typical VGA CMOS imager pixel size may be five to six microns, compared to a megapixel imager which could have pixels as small as 1.1 microns. As a result, maintaining sensitivity as resolution goes up becomes a very big challenge.

Typical CMOS imager pixels each have a photosensitive region and an opaque shielded data storage region that temporarily stores the imaging data from that pixel before readout and does not serve to absorb light, and therefore reduces the pixel's fill factor and its sensitivity. Typical CMOS image sensors also have crosstalk between pixels, that may be in the range of ten to twenty percent.

Uniformly illuminating a scene with high intensity illumination is always a challenge in typical barcode scanning applications. Very bright illumination is required to achieve a high contrast image at short exposure times needed for adequate motion tolerance. This may involve using multiple light sources, which adds to the size of a scanner and imposes requirements for higher currents, resulting in greater power demand and thermal implications. Multiple illumination sources and higher power demand imposes design challenges on a small integrated barcode scanner.

The discussion above is merely provided for general background information and is not intended to be used as an aid in determining the scope of the claimed subject matter.

SUMMARY

Devices, systems, and methods are disclosed for imaging with an indicia reading device based on semiconducting nanocrystals that function as quantum dots, and decoding decodable features in the images. In an illustrative embodiment, a device includes an imaging subsystem, a data storage element, and a processor. The imaging subsystem includes an image sensor array and an imaging optics assembly operative for focusing an image onto the image sensor array. The image sensor array includes a plurality of pixels wherein a pixel includes a photosensitive portion comprising one or more nanocrystals, and a read-out portion capable of relaying incident light data representing light incident on the one or more nanocrystals. The data storage element is capable of storing frames of image data comprising data communicated through the read-out portion of at least some of the pixels during the imaging operation. The processor is operative for receiving one or more of the frames of image data from the data storage element and performing a decode operation for performing an attempted decode of a decodable feature represented in at least one of the frames of image data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of various illustrative embodiments. In the drawings, like numerals are used to indicate like parts throughout the various views.

DETAILED DESCRIPTION OF ILLUSTRATIVE EMBODIMENTS

Figure 1:
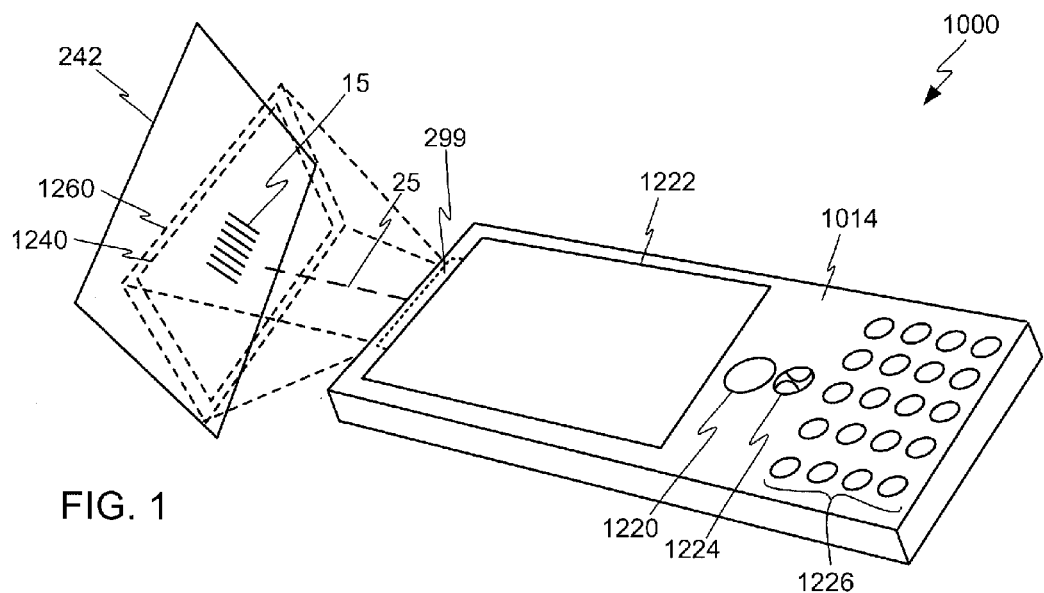
FIG. 1 depicts a perspective view of an indicia reading device, in accordance with an illustrative embodiment.
Figure 2:
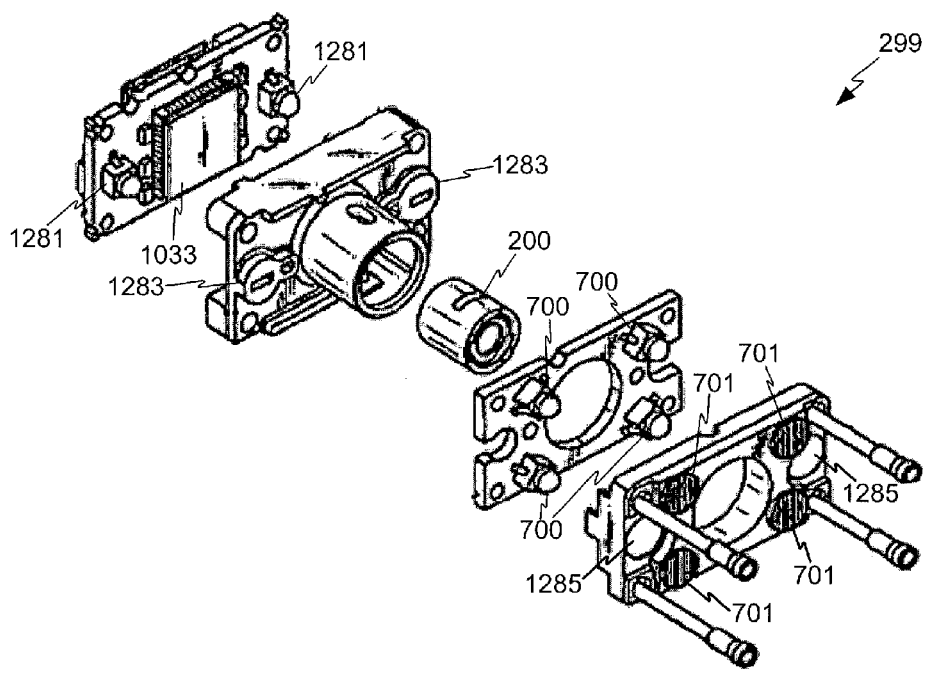
FIG. 2 depicts an exploded perspective view of an imaging module of an indicia reading device, in accordance with an illustrative embodiment.
Figure 3:
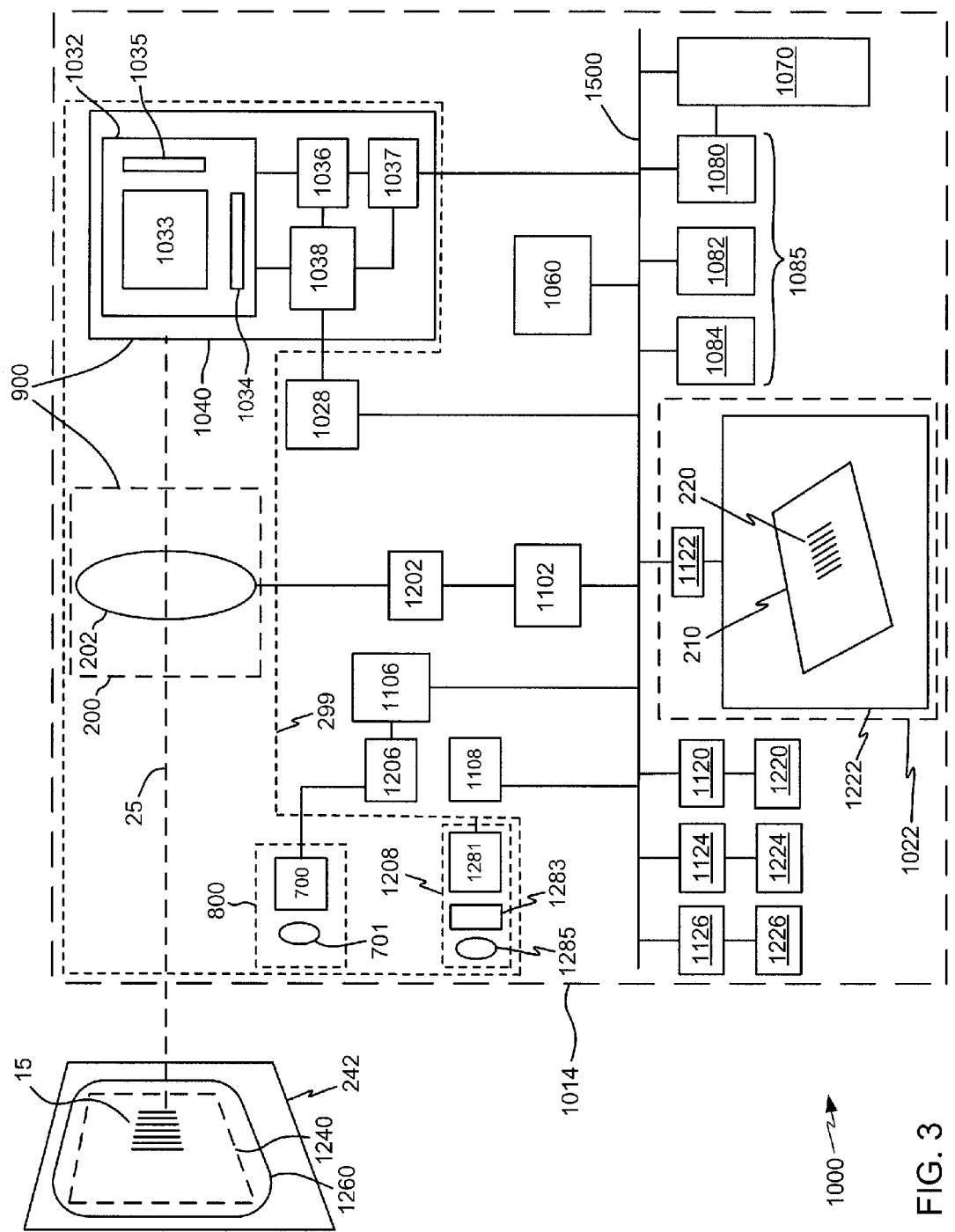
FIG. 3 depicts a block diagram of an indicia reading device, in accordance with an illustrative embodiment.
Figure 4:
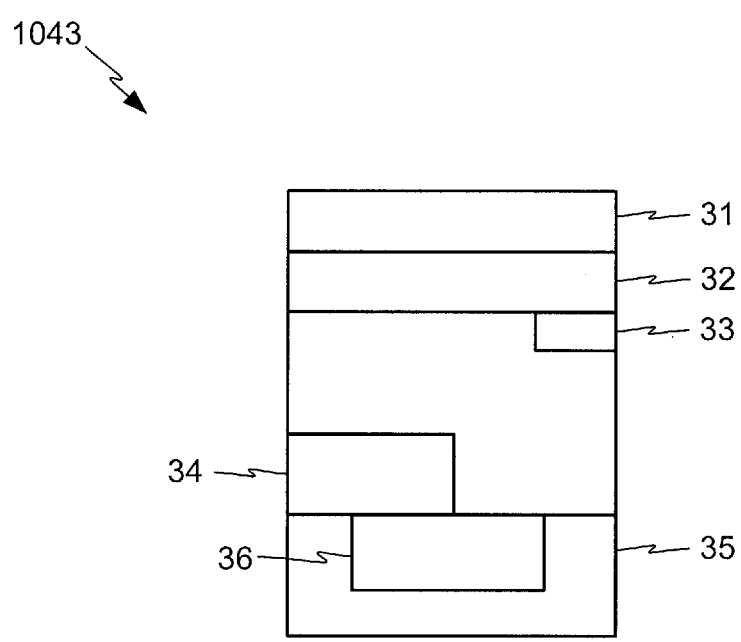
FIG. 4 depicts a simplified block diagram of a quantum dot based imaging pixel, in accordance with an illustrative embodiment.

FIG. 1 depicts a perspective view of an indicia reading device 1000 that uses a quantum dot based imaging subsystem 299, in accordance with an illustrative embodiment. Indicia reading device 1000 is depicted imaging or scanning a decodable feature 15 on a substrate 242. FIG. 2 depicts an exploded perspective view of quantum dot based imaging subsystem 299 that includes quantum dot based image sensor array 1033, in accordance with an illustrative embodiment. FIG. 3 depicts a block diagram of indicia reading device 1000 including imaging subsystem 299 with quantum dot based image sensor array 1033, in accordance with an illustrative embodiment. FIG. 4 depicts a simplified block diagram of a quantum dot based imaging pixel 1043, an array of which may be used in image sensor array 1033, in accordance with an illustrative embodiment.

Use of quantum dot based imaging pixels 1043 in image sensor array 1033 may provide close to approximately a 100% fill factor and close to approximately 90% quantum efficiency, thereby providing considerably enhanced light sensitivity for the same surface area of pixel compared with other pixel technologies such as CMOS or back illuminated sensors. Additionally, the increased sensor sensitivity and signal to noise/resolution with quantum dot based image sensor array 1033 may offset the need for multiple illumination sources, so that illumination subsystem 800 may include only a single illumination source, such as a single LED lamp rather than a bank of multiple LEDs, in an illustrative embodiment, which also reduces the need for high current and high current drives. The quantum dot based image sensor array 1033 thereby enables indicia reading device 1000 to have a smaller illumination subsystem, a smaller and lower current power subsystem, and smaller size and mass overall, without loss to performance, compared with using traditional image sensor arrays using CMOS or CCD technologies for example. Alternatively, a traditional illumination subsystem with multiple LEDs and a higher-current power system may be used in conjunction with the quantum dot based image sensor array 1033, to provide a greater dynamic range of the indicia reading device 1000 than in a comparable device without a quantum dot based image sensor array.

The quantum dot based image sensor array 1033 may also enable in-pixel data storage portions in each or substantially each pixel, below the photosensitive portion of the pixel and out of the path of incoming light, in an illustrative embodiment, so that it does not block any of the area of incoming light. The quantum dot based image sensor array 1033 may also enable the pixels or subsets of the pixels to be selectively addressed and activated simultaneously, to begin imaging simultaneously and stop imaging simultaneously, for each pixel's data to be stored locally within the pixel and then accessed as needed, enabling an electronic simultaneous shutter across all the pixels or any desired subset of the pixels. This may eliminate distortion and skew of the type that may take effect in some traditional imaging technologies such as a CMOS imager with a rolling shutter.

Indicia reading device 1000 includes quantum dot based imaging module 299, in accordance with an illustrative embodiment. Indicia reading device 1000 is depicted reading an indicia 15 on a substrate 242, which may be a piece of paper, a label, a box, a package, a product, a sign, or any other kind of substrate. Indicia 15 is depicted as a one-dimensional barcode, but could also be characters, words, sentences, one dimensional (1D) barcodes, stacked 1D barcodes, and two dimensional (2D) barcodes, in any of a variety of formats, for example. The elimination of distortion and skew using an electronic simultaneous shutter in a quantum dot based image sensor array 1033 may be particularly valuable for imaging and decoding decodable features such as these 1D barcodes, and 2D barcodes, and written characters, by eliminating distorting effects on the images of those decodable features due to relative motion between the decodable features and the imaging module 299 of the indicia reading device 1000 during an imaging operation, for example.

FIG. 2 depicts an exploded perspective view of imaging module 299 of an indicia reading device 1000, in accordance with an illustrative embodiment that corresponds with indicia reading device 1000 as shown in FIG. 1. FIG. 3 depicts a block diagram of indicia reading device 1000, in accordance with an illustrative embodiment that corresponds with indicia reading device 1000 as shown in FIG. 1 and imaging module 299 as shown in FIG. 2. Referring to FIGS. 1 through 3, with various indicated features depicted in one or more of these figures, there is set forth herein a novel indicia reading device 1000 having an imaging module 299, a hand held housing 1014, a memory 1085, and a processor 1060, where imaging module 299 includes an imaging illumination subsystem 800, an aimer subsystem 1208, and a quantum dot based imaging subsystem 900. Imaging illumination subsystem 800 may be operative for projecting an illumination pattern. Imaging subsystem 900 may include a quantum dot based image sensor array 1033 and an imaging optics assembly 200 operative for focusing an image onto the image sensor array 1033. Hand held housing 1014 encapsulates imaging illumination subsystem 800 and imaging subsystem 900, in this illustrative embodiment. Memory 1085 is capable of storing one or more frames of image data, in which the frames of image data may represent light incident on quantum dot based image sensor array 1033. Processor 1060 is operative for addressing memory 1085 and processing the frames of image data, such as processing for attempting to decode decodable indicias represented in the image data.

Indicia reading device 1000 is depicted as an indicia reading terminal in FIG. 1, but may take the form of any type of device capable of capturing an image and subjecting the image to decoding operations for attempting to decode a decodable feature in the image. Various embodiments of the indicia reading device may include smartphones, mobile phones, tablet computers, hand held mobile computers, tablet computer, netbook computers, laptop computers, e-book readers, or any of a wide range of other types of digital devices with imaging subsystems in various embodiments. In the illustrative embodiment of FIG. 1, device 1000 includes user interface elements including trigger 1220, display screen 1222, pointer mechanism 1224, and keypad 1226, disposed on a common side of a housing 1014. Display screen 1222 in one embodiment may incorporate a touch panel for navigation and virtual actuator selection, so that display screen 1222 serves as both user input device and user output device of device 1000. Display screen 1222 and pointer mechanism 1224 in one embodiment perform as user interface elements or user input/output components of device 1000. Various embodiments of device 1000 may also include other keys, a slide-out or fixed keyboard, a trigger, and/or other user input/output components, for example.

FIG. 1 depicts imaging subsystem 299 of device 1000 being used to image a target 110 having a decodable feature 15. Device 1000 may capture a stream of image frames of the field of view 1240 of imaging subsystem 299, and process the image frames for performing an attempted decode of decodable feature 15. Imaging subsystem 299 includes an illumination subsystem 800 that projects illumination field 1260 to surround field of view 1240, in this illustrative embodiment. Decodable feature 15 is a one-dimensional barcode in this example, other decodable features scanned by device 1000 may include two-dimensional barcodes, words and sentences written in alphabetic characters, or any other kind of decodable symbols. Other decodable features may include any type of writing written in any language in any type of characters; numbers, equations, one or two dimensional barcodes of any format or standard, or any other kind of representational symbol.

Device 1000 is operative not only for capturing and displaying targets and decodable features, but also for performing decodes of the decodable features and acquiring the information they represent. For example, device 1000 may have a decode subsystem that recognizes the representational format of decodable feature 15, namely alphabetic letters representing words in the English language, and applies one or more optical character recognition (OCR) processes to acquire the words represented in the text. Other decoding processes may be applied to other forms of decodable features, such as barcode decoding algorithms to an image of a two-dimensional barcode, or a document capture program for scanning and saving a document, for example. Device 1000 may also render an output on display screen 1222 that displays output text or other information decoded from or that represents or is based on the decoded information from the decodable feature 15. The decoded information produced by the successful decode of decodable features may also be provided in any other format of output, such as a text translation into another language, a text-to-speech audio output, or a transmission to another device, a network node, or another computing environment resource, for example.

As shown in the illustrative embodiment of FIG. 4, quantum dot based pixel 1043 comprises color filter 31, nanocrystal layer 32, second pixel electrode 33, first pixel electrode 34, semiconducting substrate 35, and in-pixel data storage portion 36. Nanocrystal layer 32 serves as a photosensitive portion of the pixel 1043, and includes semiconducting nanocrystals that function as quantum dots. An individual semiconducting nanocrystal may contain a semiconductor such as silicon which is sized on a nanoscopic scale, e.g. near or below about a micrometer in dimension, and has an internal crystalline structure with a discontinuous boundary at its edges. Semiconducting substrate 35 and in-pixel data storage portion 36 may be formed on a silicon wafer, for example. First pixel electrode 34 and second pixel electrode 33 may be defined on semiconducting substrate 35 through any of a variety of lithographic manufacturing techniques. Nanocrystal layer 32 may be colloidally suspended in a polymer substrate and applied by spin coating, or may be applied by imprinting, or any other application technique, in various illustrative embodiments. A quantum dot based image sensor array 1033 using quantum dot based pixels 1043 may thereby be fabricated using semiconductor manufacturing techniques allowing for feasible mass production. A variety of other arrangements and embodiments of quantum dot based pixels may be used in other embodiments, such as with other arrangements of electrodes. First pixel electrode 34 and second pixel electrode 33 may be connected to row circuitry and column circuitry with other pixels in an image sensor array 1033, and thereby enabled to receive control signals and to send imaging data collected in each pixel.

The photosensitive nanocrystal layer 32 may contain a number of semiconducting nanocrystals that are annealed or networked to have semiconductive contacts among adjacent nanocrystals. Such contacts with adjacent nanocrystals, as long as they are sufficient but not too prolific, allow conductive charge carrier propagation through the nanocrystal layer 32, without destroying the quantum dot nature of each individual semiconducting nanocrystal. An appropriate degree of conductive contacts among adjacent nanocrystals may slightly to moderately increase the characteristic wavelength of light to which the nanocrystal is sensitive. Secondary effects such as this may be accounted for, along with nanocrystal size, in planning the nanocrystal sizes to be used in the photosensitive layer to optimize for the desired sensitive wavelengths.

In various illustrative embodiments, the photosensitive nanocrystal layer 32 may be positioned on top of an electrode array with at least one pixel electrode per pixel 1043. In various embodiments, a representative pixel may have both a first pixel electrode 34 and a second pixel electrode 33 which complete a circuit within the pixel 1043. In various embodiments, a representative pixel may have only a single pixel electrode, which may have a counterpart in an array electrode outside the pixel that completes a circuit with multiple single pixel electrodes including the single pixel electrode in the representative pixel. In various other embodiments, including both single electrode per pixel and paired electrodes per pixel, the electrodes may be biased with a bias voltage, for example.

The pixel electrodes may electrically bias the nanocrystal layer 32, creating electric fields. When a photon having a wavelength in the range of sensitivity of the nanocrystals in nanocrystal layer 32 strikes the pixel 1043, it excites charge carrier pairs e.g. electron-hole pairs in a nanocrystal within nanocrystal layer 32. Nanocrystal layer 32 may illustratively have a range of nanocrystal sizes suitable for sensitivity to wavelengths across the range of visible light, in an illustrative embodiment. The charge carriers, in the presence of the electric fields, may propagate through the nanocrystals in the nanocrystal layer 32 to the pixel electrodes. This propagation may be facilitated by the electrode bias. This propagation may take place across multiple nanocrystals, such as through areas where adjacent nanocrystals share conductive connections with each other. The photoexcited charge carriers may propagate toward their collecting electrodes, essentially imposing a virtual pixel structure. The nanocrystal layer 32 may be engineered to have a diffusion length that ensures that the charge carriers, e.g. electrons and/or holes, can make it to either side of a grid line and still successfully get collected. This may lead to a couple of percent crosstalk, but is a substantial improvement over existing image sensors, which typically have crosstalk in the range of ten to twenty percent. The nanocrystal layer 32 based pixels may provide a near 100 percent fill factor and quantum efficiencies around 90 percent in various embodiments.

The range of photon wavelengths to which the nanocrystals are photosensitive may be determined by the physical properties of the semiconductive nanocrystals, such as the size of individual nanocrystals, the shape of individual nanocrystals, the range of sizes of multiple nanocrystals, the proximity of adjacent nanocrystals for quantum tunneling propagation among adjacent nanocrystals, and the degree of conductive connections among adjacent nanocrystals for conductive propagation among adjacent nanocrystals, for example. For example, the size of a given nanocrystal is a major determinant of the wavelengths to which it is photosensitive, or the probability for a given wavelength that an incoming photon will interact with the nanocrystal in such a way as to excite a charge carrier over the band gap from the valence band to the conductive band of the nanocrystal. The nanocrystals may be sized to have a band gap sensitive to visible light, or to particular wavelengths or sections of spectrum within the visible spectrum, approximately in the range of 390 to 750 nanometers in wavelength. The degree of conductive connections from a given nanocrystal to adjacent nanocrystals also affects the photosensitive wavelength spectrum of the nanocrystal, by eroding the confinement of the wave functions of the charge carriers in the nanocrystal, which tends to lower the wavelength of photons to which the nanocrystal is photosensitive.

The range of sizes of nanocrystals in the nanocrystal layer 32 may also affect the photosensitive spectrum of the nanocrystal layer. In various illustrative embodiments, a range of different sizes of photosensitive nanocrystals may be included in the photosensitive nanocrystal layer, which may increase the range of wavelengths to which the photosensitive nanocrystal layer is sensitive and/or increase the total quantum efficiency of the photosensitive nanocrystal layer across a spectrum of wavelengths of interest. In various illustrative embodiments, a photosensitive nanocrystal layer 32 may include a range of sizes of nanocrystals mixed homogeneously within a single layer. In various other illustrative embodiments, the photosensitive nanocrystal layer may include two or more sublayers, where each of the sublayers has its own characteristic size of nanocrystals, or range of sizes of nanocrystals. For example, a gradient of nanocrystal sizes may be used among descending layers, which may be used to increase or optimize quantum efficiency of the total layer across the spectrum of wavelengths of interest. Various other physical properties may also be differentiated between the different sublayers, such as characteristic distance between nanocrystals or characteristic degree of conductive connection among adjacent nanocrystals.

In various additional embodiments, electrodes may also be layered among two or more sublayers of the photosensitive nanocrystal layer, to create three-dimensional resolution in the photosensitive nanocrystal layer, with two or more sublayer electrodes stacked on top of each other with sensitivities to different properties, such as different wavelengths per layer. This may be used, for example, to collect full color data for the incoming light while using the entire surface of the photosensitive nanocrystal layer for the full color spectrum, instead of the traditional practice of resorting to different color filters across different portions of the area of a photosensitive array, which inherently trades off a reduction in overall photosensitive efficiency for color imaging capability.

For example, in an illustrative embodiment, the photosensitive nanocrystal layer may be layered in three separate sublayers, each with a different characteristic size of nanocrystal, so that a first sublayer has nanocrystals sized to be most sensitive to wavelengths centered on a first color, a second sublayer has nanocrystals sized to be most sensitive to wavelengths centered on a second color, and a third sublayer has nanocrystals sized to be most sensitive to wavelengths centered on a third color. The first, second, and third colors may be selected to provide a balanced three-color palette for representing full-color images, such as cyan, magenta, and yellow, for example. The three sublayers may be stacked on top of each other in the layer, for example. The layer may be positioned on a read-out substrate that may include electrode towers that may provide separate electrodes at each of the three sublayers, defining a pixel stack of three vertically stacked pixels under a single section of surface area of the layer. The nanocrystals within each sublayer may be merged to provide electrically conductive connections among the nanocrystals within the sublayer and conductively connecting the nanocrystals in the sublayer to the electrode for that sublayer, while at the same time, the nanocrystals in one sublayer are electrically isolated from the nanocrystals in the adjacent sublayer or sublayers in the pixel stack. The sublayers may therefore be electrically isolated from each other, while not affecting the transitivity of the sublayers to the incoming light.

In an illustrative embodiment, a given pixel stack may be arranged with a first sublayer, at the surface of the pixel, with the smallest nanocrystals, centered on photosensitivity to cyan-wavelength photons; a second sublayer, in the middle of the pixel, with nanocrystals sized intermediately relative to the first and third sublayers, centered on photosensitivity to yellow-wavelength photons; and a third sublayer, at the surface of the pixel, with the largest nanocrystals, centered on photosensitivity to magenta-wavelength photons. The size range of nanocrystals within each layer may or may not overlap to some degree. The thickness of each of the sublayers may be tuned to promote or optimize total quantum efficiency of the layer, and to promote or optimize distribution of wavelength collection between the sublayers.

A stacked photosensitive nanocrystal layer for full-surface color imaging may therefore be fabricated using feasible techniques, which may for example involve creating the read-out substrate with three-storey electrode towers using semiconductor manufacturing techniques, then applying three separate photosensitive nanocrystal sublayers. For example, each photosensitive nanocrystal sublayer may be prepared as a colloidal suspension of characteristically sized nanocrystals for the given sublayer in a polymer solution, and spin-coating the polymer solution onto the read-out substrate, where a first colloidal polymer solution for the magenta-centered nanocrystals is applied first, followed by a second colloidal polymer solution for the yellow-centered nanocrystals, and finally a third colloidal polymer solution for the cyan-centered nanocrystals. Each sublayer may be applied with a thickness predetermined for optimizing the photosensitivity of that sublayer for its color range within the constraint of maximizing the total quantum efficiency of the three sublayers together, and the read-out substrate may be fabricated such that each of the sublayer electrodes in its three-storey electrode towers is at an appropriate height to be in contact with its targeted sublayer while being electrically isolated from the other two sublayers.

Returning to FIG. 3, the illustrative embodiment of indicia reading device 1000 as depicted in block diagram form in FIG. 3 illustrates various additional hardware platform features for support of operations described herein, according to a variety of illustrative embodiments. For example, processor 1060 may illustratively be or include a central processing unit (CPU) in the embodiment of indicia reading device 1000 of FIGS. 1 and 3. Processor 1060 may illustratively be or include a complex programmable logic device (CPLD), an application-specific integrated circuit (ASIC), a field programmable gate array (FPGA), or any type of circuit capable of processing logic operations, in accordance with various embodiments.

In an illustrative embodiment, elements of an imaging illumination subsystem 800 and an imaging subsystem 900 may be incorporated into an imaging module 299, as illustratively depicted in FIGS. 1, 2, and 3. An imaging module 299 may include various elements as depicted in FIGS. 2 and 3 as well as potentially additional elements in various embodiments. Exemplary imaging module 299 can include a printed circuit board carrying an image sensor integrated circuit 1040 having an image sensor array 1033. Exemplary imaging module 299 can include an imaging optics assembly 200 supported by a support assembly. An imaging subsystem 900 fully or partially comprised in imaging module 299 can comprise an image sensor array 1033 which can be integrated onto image sensor integrated circuit 1040 in combination with imaging optics assembly 200.

Indicia reading device 1000 can include an image sensor 1032 comprising a multiple pixel image sensor array 1033 having quantum dot based pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read-out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components.

In one example, image sensor integrated circuit 1040 can be provided e.g., by a QuantumFilm quantum dot based pixel array image sensor integrated circuit from InVisage Technologies, Inc. of Menlo Park, Calif. In one example, image sensor integrated circuit 1040 can incorporate a Bayer pattern filter, so that certain colored pixel positions may be defined at the image sensor array, with red pixels at red pixel positions, green pixels at green pixel positions, and blue pixels at blue pixel positions. Other types of color filter arrays may be used in various embodiments. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 alternatively prior to subjecting a frame for further processing can interpolate pixel values intermediate of blue pixel positions utilizing blue pixel values.

In the course of operation of device 1000, image signals can be read-out of image sensor 1032, converted, and stored into a system memory 1085 illustratively including RAM 1080. A memory 1085 of device 1000 can include RAM 1080, a nonvolatile memory such as EPROM 1082 and a storage memory device 1084 such as may be provided by a flash memory or a hard drive memory, and/or various other types of memory components in various embodiments. In one embodiment, device 1000 can include processor 1060 which can be adapted to read-out image data stored in memory 1080 and subject such image data to various image processing algorithms. Device 1000 can include a direct memory access unit (DMA) 1070 for routing image information read-out from image sensor 1032 that has been subject to conversion to RAM 1080. In another embodiment, device 1000 can employ a system bus providing for bus arbitration mechanism (e.g., a PCI bus) thus eliminating the need for a central DMA controller. A wide variety of other embodiments of system bus architecture and/or direct memory access components may provide for efficient data transfer between the image sensor 1032 and RAM 1080 within the scope of the invention.

Referring to further aspects of device 1000, imaging optics assembly 200 can be adapted for focusing an image of a decodable indicia 15 located within a field of view 1240 on a substrate 242, onto image sensor array 1033. A size in paper space of a field of view 1240 of device 1000 can be varied in a number of alternative ways. A size in target space of a field of view 1240 can be varied e.g. by changing a terminal to target distances, changing an imaging lens setting, changing a number of pixels of image sensor array 1033 that are subject to read-out. Imaging light rays can be transmitted about imaging axis 25. Imaging optics assembly 200 can be adapted to be capable of multiple focal lengths and multiple planes of optical focus (best focus distances).

Device 1000 can include an imaging illumination subsystem 800 for illumination of a target, such as substrate 242, as in FIG. 1, and for projection of an illumination pattern 1260. Illumination pattern 1260, in the embodiment shown, can be projected to be proximate to but larger than an area defined by field of view 1240, but can also be projected in an area smaller than an area defined by a field of view 1240.

In various illustrative embodiments, imaging illumination subsystem 800 may include an imaging illumination light source assembly 700 that may include one or more light sources, according to various illustrative embodiments.

Imaging illumination light source assembly 700 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

In various illustrative embodiments, imaging illumination subsystem 800 may include an imaging illumination optical assembly 701, as is shown in the embodiment of FIGS. 2 and 3. Imaging illumination optical assembly 701, or other parts of imaging illumination subsystem 800, may include any of a variety of optical elements such as one or more lenses, one or more diffusers, one or more mirrors, and/or one or more prisms, as illustrative examples. Imaging illumination optical assembly 701 may thereby focus, diffuse, shape, or otherwise project illumination toward a target area. Imaging illumination subsystem 800 may thereby project an illumination pattern toward or onto a target area. An illumination pattern thus projected may include any type or pattern of illumination in different embodiments.

In use, device 1000 can be oriented by an operator with respect to a substrate 242 (such as a piece of paper, a package, or any other type of substrate) bearing decodable indicia 15 in such manner that illumination pattern 1260 is projected on a decodable indicia 15. In the illustrative example of FIGS. 1 and 2, decodable indicia 15 is provided by a one dimensional (1D) bar code symbol. Decodable indicia 15 may be provided by a 1D bar code symbol, a 2D bar code symbol, optical character recognition (OCR) characters, or other types of decodable indicias in various illustrative embodiments.

Referring to further aspects of device 1000, imaging optics assembly 200 can be controlled with use of electrical power input unit 1202 which provides energy for changing a plane of optimum focus of imaging optics assembly 200. In one embodiment, an electrical power input unit 1202 can operate as a controlled voltage source, and in another embodiment, as a controlled current source. Illumination subsystem light source assembly 700 can be controlled with use of light source control circuit 1206. Electrical power input unit 1202 can apply signals for changing optical characteristics of imaging optics assembly 200, e.g., for changing a focal length and/or a best focus distance of (a plane of optimum focus of) imaging optics assembly 200. Light source control circuit 1206 can send signals to illumination pattern light source assembly 700, e.g., for changing a level of illumination output by illumination pattern light source assembly 700.

Various embodiments for lens assemblies for use as imaging optics assembly 200 are described further as follows. In the embodiment of FIG. 3, imaging optics assembly 200 may comprise a fluid lens 202. Fluid lens 202 in one embodiment can be an electrowetting fluid lens comprising a plurality of immiscible optical fluids. Fluid lens 202 in one embodiment can be provided by an ARCTIC 314 or ARCTIC 316 fluid lens of the type available from VARIOPTIC S.A. of Lyon, France. Fluid lens 202 can alternatively be a fluid lens of the type having a deformable surface, and can be provided in association with a mechanical actuator assembly (not shown) coupled to power input unit 1202. Various other types of lenses and/or other optical elements may also be included in imaging optics assembly 200, in various other embodiments.

Device 1000 can also include a number of peripheral devices such as trigger 1220 which may be used to make active a trigger signal for activating frame readout and/or certain decoding processes. Device 1000 can be adapted so that activation of trigger 1220 activates a trigger signal and initiates a decode attempt. Specifically, device 1000 can be operative so that in response to activation of a trigger signal, a succession of frames can be read-out and captured by way of read-out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a bar code symbol, e.g., a one dimensional bar code symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup, as an illustrative example.

Device 1000 can include various interface circuits for coupling various of the peripheral devices to system address/data bus (system bus) 1500, for communication with processor 1060 also coupled to system bus 1500. Device 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1120 for coupling trigger 1220 to system bus 1500. Device 1000 can also include a display 1222 coupled to system bus 1500 and in communication with processor 1060, via interface 1122, as well as pointer mechanism 1224 in communication with processor 1060 via interface 1124 connected to system bus 1500.

Device 1000 can also include aimer subsystem 1208 coupled to system bus 1500 via interface 1108. As shown in FIGS. 2 and 3, aimer subsystem 1208 may illustratively include an aimer light source 1281 and aimer optical elements 1283 and 1285. For example, aimer light source 1281 may include one or more light emitting diodes (LEDs) and/or aiming lasers, while aimer optical elements may include one or more apertures 1283, and one or more lenses 1285, which may be a spherical lens, an aspheric lens, a cylindrical lens, or an animorphic lens, for example. Aimer subsystem 1208 projects light from aimer light source 1281 through aperture 1283 and optics 1285 to provide an aiming pattern onto a target to assist in capturing an image of the target with image sensor array 1033. The aimer light source 1281 may project light forward into a hemispherical pattern, for example. The front surface of an LED light source may contain an integrated convex lens surface designed to reduce the angular divergence of the light leaving the LED. As much of this light as possible is directed through the aimer aperture 1283 and directed to further pass through the aimer optics 1285. The aimer optics 1285 may be designed to create an image of the aimer aperture on the indicia located on the target, such as substrate 242. Aimer subsystem 1208 may in another implementation include a laser and a laser collimator, for example.

A succession of frames of image data that can be captured and subject to the described processing can be full frames (including pixel values corresponding to each pixel of image sensor array 1033 or a maximum number of pixels read-out from array 1033 during operation of device 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames.

A full frame can be captured by selectively addressing for read-out pixels of image sensor 1032 having image sensor array 1033 corresponding to the full frame. A windowed frame can be captured by selectively addressing for read-out pixels of image sensor 1032 having image sensor array 1033 corresponding to the windowed frame. In one embodiment, a number of pixels subject to addressing and read-out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame. For example, indicia reading device 1000 may be mounted to or positioned on a machine or other mount where numerous articles are repeatedly placed in the imaging target area of the device 1000 with machine-readable indicia or other decodable features that are positioned in a predictably repeatable position in the imaging target area of the device 1000. In a case such as this, the indicia reading device 1000 or a processor thereof such as processor 1060 may be programmed to only address the pixels covering this predictable position within the imaging area on each of a series of imaging targets, and then only download and perform a decoding process on this windowed portion of pixels selected from the full imaging array. In another example, indicia reading device 1000 may take one or more full initial images and subject them to a pre-processing step for just detecting and locating any candidate decodable features in an imaging area, select the section or sections of the imaging target area that are defined by candidate decodable features, and then only download or read imaging data from that selected imaging target area or those selected imaging target areas for subsequent full image processing for performing attempted decode operations on the candidate decodable features. Selecting such windowed imaging areas may help to increase the rate of imaging and downloading and processing the image data from the targets of interest, and may help reduce processing burden and power consumption in indicia reading device 1000.

Device 1000 can capture frames of image data at a rate known as a frame rate. An illustrative frame rate may be 60 frames per second (FPS) which translates to a frame time (frame period) of 16.6 milliseconds (ms), in an illustrative embodiment. Another illustrative frame rate may be 30 frames per second (FPS) which translates to a frame time (frame period) of 33.3 ms per frame, in an illustrative embodiment. In another illustrative embodiment, a frame rate of 1,000 frames per second may be used, with a frame period of 1 millisecond. Any of a wide variety of frame periods and frame rates may be used in different embodiments. The frame periods may also differ from one frame to the next, and for example may be shorter on an illuminated exposure frame, and longer on a subsequent unilluminated exposure frame. A frame rate of device 1000 can be increased (and frame time decreased) by decreasing of a frame picture size, for example.

Each frame period may illustratively include preliminary operations to an exposure, performing the exposure itself and associated simultaneous operations, and operations after the exposure. The operations after the exposure may illustratively include any or all of a process of reading data out of image sensor 1032; providing post-exposure flicker correction illumination with imaging illumination subsystem 800; converting, storing, or buffering data in system memory 1085; and processing stored or buffered frames by processor 1060, such as processing for attempting to decode a decodable indicia. In an illustrative embodiment, reading data out of image sensor 1032 and/or providing post-exposure flicker correction illumination may be performed within the post-exposure portion of a frame period, while at least part of additional steps of converting, storing, or buffering data, and processing stored or buffered data such as processing for attempting to decode a decodable indicia, may extend past the frame period of the exposure in which a frame of data was captured and after one or more subsequent frame periods have commenced.

An illustrative physical form factor of device 1000 in accordance with an illustrative embodiment is shown in FIG. 1. Trigger 1220, display 1222, pointer mechanism 1224, and keyboard 1226 can be disposed on a common side of a hand held housing 1014 as shown in FIG. 1. Display 1222 and pointer mechanism 1224 in combination can be regarded as user interface elements of device 1000. Display 1222 in one embodiment can incorporate a touch panel for navigation and virtual actuator selection in which case a user interface of device 1000 can be provided by display 1222. A user interface of device 1000 can also be provided by configuring device 1000 to be operative to be reprogrammed by decoding of programming bar code symbols. Imaging module 299 including image sensor array 1033 and imaging optics assembly 200 can be incorporated in hand held housing 1014. A hand held housing 1014 for device 1000 may be devoid of a display in various illustrative embodiments. A hand held housing 1014 for device 1000 may be in a gun style form factor in various illustrative embodiments. Other types of housings may be used in other embodiments such as a fixed mount housing, for example. Other form factors and sets of features and components may be used in other embodiments.

Referring to device 1000, device 1000 can be operative to change settings or states of imaging illumination subsystem 800 and imaging subsystem 900 between at least a first exposure and resulting frame of image data, and a second exposure and resulting frame of image data. The second frame can be a successive frame in relation to the first frame or a non-successive subsequent frame in relation to the first frame. The first and second frames of image data may be exposed, captured, and processed during a single trigger signal activation period (decoding sessions), or during separate trigger signal activation periods (decoding sessions), in different illustrative embodiments. As indicated, a read attempt can be commenced by activation of a trigger signal resulting from depression of a trigger and can be ceased by deactivation of a trigger signal resulting e.g., from a release of the trigger.

Device 1000 may be used for a decoding imaging operation by a user activating an input manually, or may activate due to an automated activation signal, in different implementations. A manual input may be through a physical component, such as trigger 1220 of device 1000, that may be physically depressed, pulled, or touched, for example, or it may be a widget on a touch screen, such as display 1222 of device 1000, that is touched, or any other form of user input in various embodiments. The device 1000 may then perform one or more imaging and decoding cycles on an open loop basis while the trigger activation signal is on or activated, and may end when the trigger signal stops or is no longer active, such as due to a release of a trigger, an expiration of a timeout period, or a successful decode, for example. While these illustrative examples involve manual trigger modes, various embodiments may also use automatic trigger modes.

One or more parameter determination exposures may be made prior to one or more decoding exposures of image frames for an attempted decode operation. Parameter determination exposures may be used for determining operating parameters of subsequent exposures for actually acquiring frames of image data for attempted decoding. These parameter determination exposures may be exposed and processed to determine parameters such as target distance and ambient light that are used in determining parameters such as focus and illumination duration for subsequent decoding exposures for attempted indicia decoding. The aimer subsystem 1208 of the device 1000 may also be used to project an aimer illumination pattern for aiming the imaging subsystem. A decoding exposure may involve a control processor sending an imaging illumination activation signal to imaging illumination subsystem 800 and an exposure activation signal to imaging subsystem 900 at the same time, and the imaging illumination subsystem 800 of the device 1000 projecting an illumination pattern at the same time that the imaging subsystem 900 of the device 1000 exposes a frame of image data onto an image sensor array 1033.

A frame of image data from a decoding exposure may be downloaded from image sensor array 1033 to a data storage buffer or processor for processing for performing an attempted decode. Multiple frames of image data may be buffered at the same time, in one or more data storage buffering components, and multiple frames of image data may be processed at the same time, by one or more processors. Any subset of image data may also be independently accessed from the in-pixel data storage portions of subsets of pixels for processing a windowed frame of image data, in various embodiments using in-pixel data storage portions. Other embodiments may be used without in-pixel data storage portions. Each frame of image data may be downloaded from the image sensor array 1033, to a buffer or directly to a processor, at the end of the exposure period in which it is acquired. This may be followed by performing an attempted decode on at least one of the frames of image data. One or more frames of image data may be analyzed at the same time, by one or more processors, in the attempt to decode an indicia from at least one of the frames of image data.

An ongoing series of decode exposures may be brought to a conclusion after a successful decode of a target indicia, in an illustrative embodiment. The step of attempting to decode an indicia may continue running in parallel with ongoing operation of acquiring new exposures; and attempting to decode an indicia may continue operating on multiple frames of image data at the same time, using multiple exposure frames, until an indicia is decoded in any one of the frames, in various embodiments.

Either one or several decoding exposures may be performed by a device 1000. A device 1000 may be set to perform a certain number of decoding exposures, unless it decodes an indicia before the set number is finished and stops early; or a device 1000 may be set to continue performing decoding exposures on an open-ended basis until an indicia decode occurs, and then stop; or a device 1000 may be set to continue performing decoding exposures on an ongoing open-ended basis after one or more indicia decodes occur, in various settings or implementations. Different operational settings such as these may be determined by a user input, or may be set by a default or an automated process in different illustrative implementations. In an illustrative embodiment, device 1000 can be operative so that device 1000 may be configured for any of several optional operating modes via menu selections, or by an XML based configuration file, for example. The XML file may be edited using an appropriate editor of a software development kit (SDK) that may be sold with mobile device 1000, offered for download on a website, or otherwise made available, in different illustrative embodiments. A configuration file can contain several sections, each of which can contain keys that define operational parameters for imaging and performing attempted decodes on decodable features. Device 1000 can be operative so that different configuration options are displayed on a menu on display screen 1222. A user interface of mobile device 1000 may also be provided by configuring device 1000 to be operative to be reprogrammed by decoding of programming barcode symbols, that may be scanned and decoded by device 1000 where the decoded information is received as programming instructions for the device 1000.

The capability for the pixels to be instructed to begin an exposure simultaneously and end an exposure simultaneously and for each pixel to store its own data in its own in-pixel data storage portion enables the use of an electronic simultaneous shutter instead of a traditional rolling shutter. The simultaneous shutter is capable of simultaneously exposing all or substantially all or a subset of the pixels in the two-dimensional array. In one embodiment, an electronic simultaneous shutter control module includes a timing module. The row and column address and decode module is used to select particular pixels for various operations such as collection activation, electronic simultaneous shutter data storage and data read-out. A read-out module may organize and process the reading out of data from the sensor array. In various embodiments, the sensor array control module may also include a rolling shutter control module that is capable of sequentially exposing and reading out the lines of pixels in the image sensor array.

Processing the electric signal within the pixels, such as measured in charge resulting from incident light and resulting photoexcited charge carriers, to produce image data may include, for example, amplifying the data generated from the incident radiation. The processing may further include storing the generated image data values in the in-pixel data storage portion of each of the plurality of pixels. The process may additionally includes reading out and processing the stored image data values from the plurality of pixels. The processing can include amplifying the data generated from the incident radiation and converting the generated data into a digital signal. The processing can also include storing a set of digital signal values corresponding to incident light on the plurality of pixels of image sensor array module 182 as a frame of image data. Device 1000 may store into a memory module a frame of image data including a plurality of N-bit (grey scale) pixel values, each pixel value representing light incident at one of the plurality of pixels, in one illustrative embodiment. In one embodiment, the reading out of the plurality of pixels is controlled by a read-out timing control pulse generated by the read-out module of the sensor array control module. In one embodiment, the read-out timing control pulse includes a plurality of pulses transmitted to each of the plurality of pixels. In one embodiment, at least a portion of the illumination control timing pulse occurs during the exposure control timing pulse. In one such embodiment, the operation of the image collection module including the sensor array control module with the global electronic shutter control module is coordinated with the operation of the illumination module including the illumination control module by the control module to achieve the overlap in the illumination and exposure control timing signals. In various embodiments, the device 1000 is capable of operating in either a rolling shutter mode or a simultaneous shutter mode. In one such embodiment, the rolling shutter mode is used as part of an automatic focusing operation and the global electronic shutter mode is used to collect image data once the proper focus has been determined.

Processing to attempt to decode a decodable feature may involve a decoder module, which may be used to decode target data such as one and two-dimensional bar codes such as UPC/EAN, Code 11, Code 39, Code 128, Codabar, Interleaved 2 of 5, MSI, PDF417, MicroPDF417, Code 16K, Code 49, MaxiCode, Aztec, Aztec Mesa, Data Matrix, Qcode, QR Code, UCC Composite, Snowflake, Vericode, Dataglyphs, RSS, BC 412, Code 93, Codablock, Postnet (US), BPO4 State, Canadian 4 State, Japanese Post, KIX (Dutch Post), Planet Code, OCR A, OCR B, and any other type or protocol for decodable features. In various embodiments, the decoder module may also include autodiscrimination functionality that allows it to automatically discriminate between a plurality of barcodes such as those listed above, a plurality of written human languages, a plurality of computer programming languages, mathematical notations, and other decodable features.

Many functions of electrical and electronic apparatus can be implemented in hardware (for example, hard-wired logic), in software (for example, logic encoded in a program operating on a general purpose processor), and/or in firmware (for example, logic encoded in a non-volatile memory that is invoked for operation on a processor as required). One implementation of hardware, firmware and software may be substituted for another implementation of the equivalent functionality using a different one of hardware, firmware and software. To the extent that an implementation can be represented mathematically by a transfer function, for example, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, may be included herein.

A small sample of illustrative devices, systems, apparatuses, or methods that are described herein is as follows:

A1. A device comprising:

an imaging subsystem comprising an image sensor array and an imaging optics assembly operative for focusing an image onto the image sensor array, the image sensor array comprising a plurality of pixels wherein a pixel comprises a photosensitive portion comprising one or more nanocrystals, and a read-out portion capable of relaying incident light data representing light incident on the one or more nanocrystals;

a data storage element capable of storing frames of image data comprising data communicated through the read-out portion of at least some of the pixels during the imaging operation; and a processor operative for receiving one or more of the frames of image data from the data storage element and performing a decode operation for attempting to decode a decodable feature represented in at least one of the frames of image data.

A2. The device of A1, wherein a plurality of the nanocrystals in the pixel are largely composed of a semiconducting material and have electrically conductive connections among at least some adjacent nanocrystals in the pixel.

A3. The device of A1, wherein one or more of the nanocrystals has a band gap sensitive to visible light.

A4. The device of A1, wherein each of a plurality of the pixels further comprises an in-pixel data storage portion capable of storing the data representing light incident on the one or more nanocrystals, and communicating the data representing light incident on the one or more nanocrystals to the data storage element.

A5. The device of A4, wherein each of a plurality of the pixels is configured for initiating recording image data at the same time and finishing recording image data at the same time during the imaging operation.

A6. The device of A4, further comprising a global electronic shutter control circuitry, the global electronic control circuitry configured to generate an exposure control timing pulse that is capable of causing simultaneous exposure of said pixels of said image sensor array during the imaging operation.

A7. The device of A4, wherein the device is operative to selectively address and read-out image data from the in-pixel data storage portions comprised in a first plurality of the pixels independently of the in-pixel data storage portions comprised in a second plurality of the pixels.

A8. The device of A1, wherein the device is operative to selectively address and read-out from the image sensor array image data from a first plurality of said pixels independently of a second plurality of said pixels.

A9. The device of A1, wherein the processor is further operative for addressing a subset of the pixels, receiving a windowed frame of image data from the subset of the pixels, and performing a decode operation for attempting to decode a decodable feature represented in the windowed frame of image data.

A10. The device of A1, wherein the read-out portion comprises at least a first pixel electrode and a second pixel electrode both connecting the photosensitive portion to a data read-out structure.

A11. The device of A1, wherein the wherein the read-out portion comprises at least a first pixel electrode connecting the photosensitive portion to a data read-out structure, and the imaging subsystem further comprises one or more array electrodes positioned outside the pixels that complete a circuit with the first pixel electrode.

A12. The device of A1, wherein a representative pixel comprises a plurality of pixel sublayers, wherein each of the pixel sublayers comprises an average nanocrystal size different from an average nanocrystal size of the other pixel sublayer or sublayers.

A13. The device of A12, wherein the pixel sublayers are sized to promote both distribution of wavelength collection between the sublayers, and total quantum efficiency of the pixel.

A14. The device of A12, wherein the read-out portion of the pixel further comprises a plurality of sublayer electrodes such that at least one of the sublayer electrodes is in contact with each of the pixel sublayers.

A15. The device of A1, wherein a representative pixel comprises a first pixel sublayer at a surface of the pixel, a second pixel sublayer below the first pixel sublayer, and a third pixel sublayer below the second pixel sublayer, wherein the first pixel sublayer has a first average nanocrystal size, the second pixel sublayer has a second average nanocrystal size that is larger than the first average nanocrystal size, and the third pixel sublayer has a third average nanocrystal size that is larger than the second average nanocrystal size.

A16. The device of A15, wherein the first average nanocrystal size has a peak absorption wavelength closer to the blue end than the red end of the visual spectrum; the third average nanocrystal size has a peak absorption wavelength closer to the red end than the blue end of the visual spectrum; and the second average nanocrystal size has a peak absorption wavelength between the peak absorption wavelengths of the first average nanocrystal size and third average nanocrystal size.

A17. The device of A1, further comprising an imaging activation input element for activating an imaging operation with the imaging subsystem.

A18. The device of A1, further comprising an illumination subsystem operative for projecting an illumination pattern during at least a portion of the imaging operation.

A19. The device of A18, wherein the illumination subsystem comprises a single illumination source.

A20. The device of A1, wherein the nanocrystals are colloidally suspended in a polymer medium.

A21. The device of A1, wherein the nanocrystals are imprinted on the read-out portion.

A22. A method comprising:
using an imaging subsystem comprising an image sensor array and an imaging optics assembly, focusing an image onto the image sensor array, the image sensor array comprising a plurality of pixels wherein a pixel comprises a photosensitive portion comprising a plurality of semiconducting nanocrystals with electrically conductive connections among at least some adjacent nanocrystals, and a read-out portion capable of relaying incident light data representing light incident on the one or more nanocrystals;
storing the incident light data in each of a plurality of the pixels on in-pixel data storage portions comprised in each of the plurality of the pixels;
communicating the incident light data from one or more of the pixels to a data storage element external to the image sensor array;
storing frames of image data, comprising incident light data communicated from the one or more pixels, on a data storage element; and
receiving one or more of the frames of image data at a processor from the data storage element; and
using the processor, performing a decode operation for attempting to decode a decodable feature represented in at least one of the frames of image data.

A23. The method of A22, wherein each of a plurality of the pixels is configured for initiating recording image data at the same time and finishing recording image data at the same time during the imaging operation.

A24. The method of A22, further comprising an electronic simultaneous shutter control circuitry, the electronic simultaneous control circuitry configured to generate an exposure control timing pulse that is capable of causing simultaneous exposure of said pixels of said image sensor array during the imaging operation.

A25. The method of A22, wherein the device is operative to selectively address and read-out image data from the in-pixel data storage portions comprised in a first plurality of the pixels independently of the in-pixel data storage portions comprised in a second plurality of the pixels.

A26. The method of A22, further comprising positioning the imaging subsystem on a mount, determining an imaging target area of the imaging subsystem, and programming the processor to selectively address and read-out image data from the in-pixel data storage portions comprised in a first plurality of the pixels that images the imaging target area.

A27. The method of A22, further comprising taking one or more initial images, subjecting the one or more initial images to preprocessing to detect and locate any candidate decodable features in an imaging area, selecting one or more target sections of an imaging target area corresponding to the one or more initial images that are defined by the candidate decodable features, reading imaging data from the one or more target sections, and performing the decode operation for attempting to decode a decodable feature represented in the one or more target sections.

While the present invention has been described with reference to a number of specific embodiments, it will be understood that the scope of the invention is not limited to any particular embodiments or combination of embodiments or elements discussed above or depicted in the figures. Further, while in numerous cases herein wherein devices, systems, apparatuses, or methods are described as having a certain number of elements, it will be understood that such devices, systems, apparatuses, or methods can be practiced with fewer than or greater than the illustratively indicated certain number of elements. For example, where any claimed embodiment may recite a feature or at least one feature, such as an electrode, that embodiment may also comprise more than one of that feature. Also, while a number of particular embodiments have been described, it will be understood that features and aspects that have been described with reference to each particular embodiment can be used in any combination with features and aspects of any other embodiment.

What is claimed is:

1. A device comprising:
an imaging subsystem comprising an image sensor array and an imaging optics assembly operative for focusing an image onto the image sensor array, the image sensor array comprising a plurality of pixels wherein a pixel comprises a photosensitive portion comprising one or more nanocrystals, and a read-out portion capable of relaying incident light data representing light incident on the one or more nanocrystals;
a data storage element capable of storing frames of image data comprising data communicated through the read-out portion of at least some of the pixels during an imaging operation; and
a processor operative for receiving one or more of the frames of image data from the data storage element and performing a decode operation for attempting to decode a decodable feature represented in at least one of the frames of image data, wherein a representative pixel comprises a first pixel sublayer, and a second pixel sublayer:
wherein the first pixel sublayer has a peak sensitivity centered on a first visible color wherein the second pixel sublayer has a peak sensitivity centered on a second visible color,
wherein the first pixel sublayer and the second pixel sublayer are sized to promote both distribution of wavelength collection between the first pixel sublayer and the second pixel sublayer, and total quantum efficiency of the representative pixel across the spectrum of the first and second visible colors; and
wherein each of the plurality of the pixels further comprises an in-pixel data storage portion capable of storing the data representing the light incident on the one or more nanocrystals, and communicating the data representing the light incident on the one or more nanocrystals to the data storage element.

2. The device of claim 1, wherein a plurality of the nanocrystals in the representative pixel are largely composed of a semiconducting material and have electrically conductive connections among at least some adjacent nanocrystals in the representative pixel.

3. The device of claim 1, wherein one or more of the nanocrystals has a band gap sensitive to visible light.

4. The device of claim 1, wherein each of the plurality of the pixels is configured for initiating recording the image data at the same time and finishing recording the image data at the same time during the imaging operation.

5. The device of claim 1, further comprising a global electronic shutter control circuitry, the global electronic control circuitry configured to generate an exposure control timing pulse that is capable of causing simultaneous exposure of the pixels of the image sensor array during the imaging operation.

6. The device of claim 5, wherein the device is operative to selectively address and read-out the image data from the in-pixel data storage portions comprised in a first plurality of the pixels independently of the in-pixel data storage portions comprised in a second plurality of the pixels.

7. The device of claim 1, wherein the device is operative to selectively address and read-out from the image sensor array the image data from a first plurality of the pixels independently of a second plurality of the pixels.

8. The device of claim 1, wherein the processor is further operative for addressing a subset of the pixels, receiving a windowed frame of image data from the subset of the pixels, and performing a decode operation for attempting to decode a decodable feature represented in the windowed frame of image data.

9. The device of claim 1, wherein the read-out portion comprises at least a first pixel electrode and a second pixel electrode both connecting the photosensitive portion to a data read-out structure.

10. The device of claim 1, wherein the read-out portion comprises at least a first pixel electrode connecting the photosensitive portion to a data read-out structure, and the imaging subsystem further comprises one or more array electrodes positioned outside the pixels that complete a circuit with the first pixel electrode.

11. The device of claim 1, wherein the representative pixel comprises a plurality of pixel sublayers, wherein each of the pixel sublayers comprises an average nanocrystal size different from an average nanocrystal size of the other pixel sublayer or sublayers.

12. The device of claim 11, wherein the read-out portion of the representative pixel further comprises a plurality of sublayer electrodes such that at least one of the sublayer electrodes is in contact with each of the pixel sublayers.

13. The device of claim 1, wherein the representative pixel comprises the first pixel sublayer at a surface of the pixel, the second pixel sublayer below the first pixel sublayer, and a third pixel sublayer below the second pixel sublayer, wherein the first pixel sublayer has a first average nanocrystal size, the second pixel sublayer has a second average nanocrystal size that is larger than the first average nanocrystal size, and the third pixel sublayer has a third average nanocrystal size that is larger than the second average nanocrystal size.

14. The device of claim 13, wherein the first average nanocrystal size has a peak absorption wavelength closer to a blue end than a red end of a visual spectrum; the third average nanocrystal size has a peak absorption wavelength closer to the red end than the blue end of the visual spectrum; and the second average nanocrystal size has a peak absorption wavelength between the peak absorption wavelengths of the first average nanocrystal size and third average nanocrystal size.

15. The device of claim 1, further comprising an imaging activation input element for activating an imaging operation with the imaging subsystem.

16. The device of claim 1, further comprising an illumination subsystem operative for projecting an illumination pattern during at least a portion of the imaging operation.

17. The device of claim 16, wherein the illumination subsystem comprises a single illumination source.

18. The device of claim 1, wherein the nanocrystals are colloidally suspended in a polymer medium.

19. The device of claim 1, wherein the nanocrystals are imprinted on the read-out portion.

20. A method comprising:
using an imaging subsystem comprising an image sensor array and an imaging optics assembly, focusing an image onto the image sensor array, the image sensor array comprising a plurality of pixels wherein a pixel comprises a photosensitive portion comprising a plurality of semiconducting nanocrystals with electrically conductive connections among at least some adjacent nanocrystals, and a read-out portion capable of relaying incident light data representing light incident on the one or more nanocrystals, wherein the pixel includes a first pixel sublayer, a second pixel sublayer and a third pixel sublayer, a first electrode in contact with the first pixel sublayer, a second electrode in contact with the second pixel sublayer, and a third electrode in contact with the third pixel sublayer, and wherein the first pixel sublayer, the second pixel sublayer and the third pixel sublayer are sized to promote both distribution of wavelength collection between the first pixel sublayer, the second pixel sublayer and the third pixel sublayer, and total quantum efficiency of the representative pixel across a range of visible light;
storing the incident light data representing the light incident on the one or more nanocrystals in each of a plurality of the pixels on an in-pixel data storage portion comprised in each of the plurality of the pixels;
communicating the incident light data from one or more of the pixels to a data storage element external to the image sensor array;
storing frames of image data, comprising incident light data communicated from the one or more pixels, on the data storage element;
receiving one or more of the frames of image data at a processor from the data storage element; and
using the processor, performing a decode operation for attempting to decode a decodable feature represented in at least one of the frames of image data.

21. The method of claim 20, wherein each of a plurality of the pixels is configured for initiating recording the image data at the same time and finishing recording the image data at the same time during the an imaging operation.

22. The method of claim 20, further comprising an electronic simultaneous shutter control circuitry, the electronic simultaneous control circuitry configured to generate an exposure control timing pulse that is capable of causing simultaneous exposure of the pixels of the image sensor array during an imaging operation.

23. The method of claim 20, wherein a device is operative to selectively address and read-out the image data from the in-pixel data storage portions comprised in a first plurality of the pixels independently of the in-pixel data storage portions comprised in a second plurality of the pixels.

24. The method of claim 20, further comprising positioning the imaging subsystem on a mount, determining an imaging target area of the imaging subsystem, and programming the processor to selectively address and read-out image data from the in-pixel data storage portions comprised in a first plurality of the pixels that images the imaging target area.

25. The method of claim 20, further comprising taking one or more initial images, subjecting the one or more initial images to preprocessing to detect and locate any candidate decodable features in an imaging area, selecting one or more target sections of an imaging target area corresponding to the one or more initial images that are defined by the candidate decodable features, reading imaging data from the one or more target sections, and performing the decode operation for attempting to decode a decodable feature represented in the one or more target sections.

26. A device comprising:
an imaging subsystem comprising an image sensor array and an imaging optics assembly operative for focusing an image onto the image sensor array, the image sensor array comprising a plurality of pixels wherein a pixel comprises a photosensitive portion comprising one or more nanocrystals, and a read-out portion capable of relaying incident light data representing light incident on the one or more nanocrystals wherein the photosensitive portion comprising the one or more nanocrystals are sized to promote both distribution of wavelength collection over a range of visible light and total quantum efficiency of the representative pixel;
a data storage element capable of storing frames of image data comprising data communicated through the read-out portion of at least some of the pixels during an imaging operation;
a processor operative for receiving one or more of the frames of image data from the data storage element and performing a decode operation for attempting to decode a decodable feature represented in at least one of the frames of image data; and
wherein each of a plurality of the pixels further comprises an in-pixel data storage portion capable of storing the data representing light incident on the one or more nanocrystals, and communicating the data representing light incident on the one or more nanocrystals to the data storage element.

27. The device of claim 26, wherein the image sensor array is devoid of an associated color filter.

* * * * *